(12) United States Patent
Nadreau et al.

(10) Patent No.: US 8,307,784 B2
(45) Date of Patent: Nov. 13, 2012

(54) METHOD OF INJECTING A TREATMENT SUBSTANCE INTO EGGS AND THE CORRESPONDING INJECTION HEAD

(75) Inventors: Michael Nadreau, Landivisiau (FR); Florent Menguy, Brest (FR); Jean-Claude Yvin, Plougoulm (FR)

(73) Assignee: Egg-Chick Automated Technologies, Pace (FR)

( * ) Notice: Subject to any disclaimer, the term of this patent is extended or adjusted under 35 U.S.C. 154(b) by 0 days.

(21) Appl. No.: 12/675,946

(22) PCT Filed: Aug. 27, 2008
(Under 37 CFR 1.47)

(86) PCT No.: PCT/EP2008/061250
§ 371 (c)(1),
(2), (4) Date: Mar. 1, 2010

(87) PCT Pub. No.: WO2009/027442
PCT Pub. Date: Mar. 5, 2009

(65) Prior Publication Data
US 2010/0307419 A1    Dec. 9, 2010

(30) Foreign Application Priority Data
Aug. 30, 2007 (FR) ...................... 07 6066

(51) Int. Cl.
*A01K 45/00* (2006.01)
(52) U.S. Cl. ........................................ 119/6.8
(58) Field of Classification Search ............ 119/6.6, 119/6.8
See application file for complete search history.

(56) References Cited

U.S. PATENT DOCUMENTS

| | | | |
|---|---|---|---|
| 4,469,047 A | 9/1984 | Miller | |
| 4,681,063 A | 7/1987 | Hebrank | |
| 4,768,919 A | 9/1988 | Borgman et al. | |
| 4,805,778 A | 2/1989 | Nambu | |
| 4,903,635 A * | 2/1990 | Hebrank | 119/6.8 |
| 4,980,971 A | 1/1991 | Bartschat et al. | |
| 5,136,979 A | 8/1992 | Paul et al. | |
| 5,895,192 A | 4/1999 | Parnell et al. | |

(Continued)

FOREIGN PATENT DOCUMENTS
EP    1302102    4/2003
(Continued)

OTHER PUBLICATIONS

International Search Report for International Application No. PCT/EP2008/001046 dated Mar. 26, 2008.

(Continued)

*Primary Examiner* — Rob Swiatek
*Assistant Examiner* — Lisa Tsang
(74) *Attorney, Agent, or Firm* — Patterson Thuente Christensen Pedersen, P.A.

(57) ABSTRACT

An injection method for injecting a substance into eggs, and an injection head for implementing said method. The method generally includes piercing the shell and at least the shell membrane of an egg by moving a needle, and then injecting the treatment substance via said needle, said piercing step comprising a first movement of the needle to pierce the shell with a first penetration force and then a second movement of the needle to pierce at least the shell membrane with a second penetration force lower than the first penetration force.

9 Claims, 1 Drawing Sheet

U.S. PATENT DOCUMENTS

| | | | |
|---|---|---|---|
| 5,898,488 A | 4/1999 | Kuhl | |
| 5,941,696 A | 8/1999 | Fenstermacher et al. | |
| 6,286,455 B1 | 9/2001 | Williams | |
| 6,499,428 B1 | 12/2002 | Prindle | |
| 6,535,277 B2 | 3/2003 | Chalker et al. | |
| 2003/0150387 A1 | 8/2003 | Hebrank | |
| 2004/0065263 A1 | 4/2004 | Hebrank et al. | |
| 2005/0030521 A1 | 2/2005 | Phelps et al. | |
| 2005/0132964 A1 | 6/2005 | Breuil et al. | |
| 2005/0284376 A1* | 12/2005 | Smith | 119/6.8 |
| 2006/0082759 A1 | 4/2006 | Hebrank | |
| 2006/0185601 A1* | 8/2006 | Correa et al. | 119/6.8 |
| 2007/0044721 A1 | 3/2007 | Ilich | |
| 2010/0139567 A1 | 6/2010 | Yvin et al. | |
| 2010/0180821 A1 | 7/2010 | Poulard et al. | |
| 2010/0221093 A1 | 9/2010 | Mogenet et al. | |
| 2012/0017835 A1 | 1/2012 | Nadreau et al. | |

FOREIGN PATENT DOCUMENTS

| | | |
|---|---|---|
| EP | 1557083 | 7/2005 |
| FR | 2858919 | 2/2005 |
| FR | 2 873 894 A1 | 2/2006 |
| JP | 63-107940 | 5/1988 |
| WO | WO 98/31216 | 7/1998 |
| WO | WO2006/078499 | 7/2006 |

OTHER PUBLICATIONS

International Preliminary Report on Patentability and Written Opinion dated May 4, 2010 from International Application No. PCT/EP2008/063997.

International Preliminary Report on Patentability and Written Opinion dated Mar. 2, 2010 from International Application No. PCT/EP2008/061250.

Application and File History for U.S. Appl. No. 12/527,536, filed Dec. 15, 2009, inventor Yvin.

Application and File History for U.S. Appl. No. 12/740,649, filed Apr. 29, 2010, inventors Nadreau et al.

Application and File History for U.S. Appl. No. 12/527,541, filed May 4, 2010, inventors Mogenet et al.

* cited by examiner

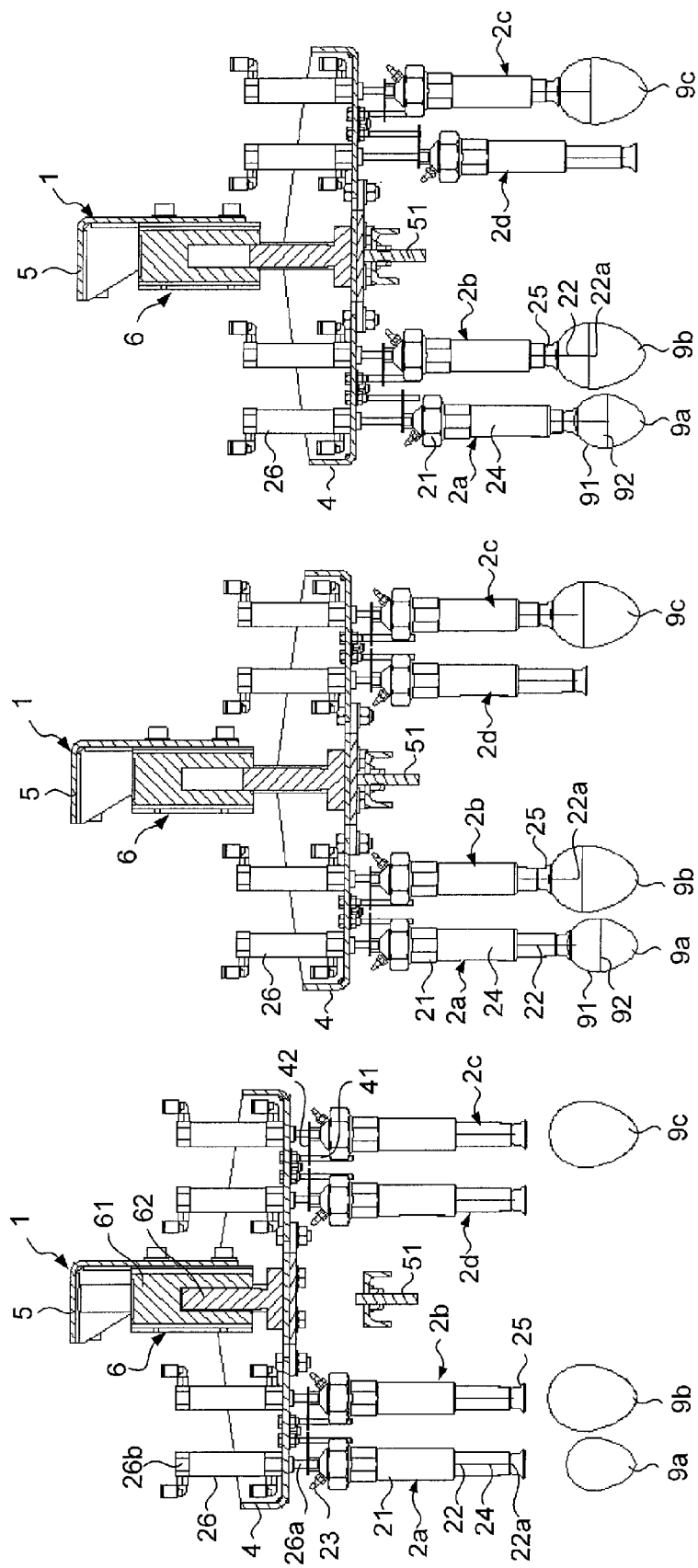

METHOD OF INJECTING A TREATMENT SUBSTANCE INTO EGGS AND THE CORRESPONDING INJECTION HEAD

PRIORITY CLAIM

The present application is a National Phase entry of PCT Application No. PCT/EP2008/061250, filed Aug. 27, 2008, which claims priority from French Application No. 0706066, filed Aug. 30, 2007, the disclosures of which are hereby incorporated by reference herein in their entirety.

FIELD OF THE INVENTION

The present invention concerns an injection method for injecting substances into eggs, in particular birds' eggs, and an injection head for implementing said method.

BACKGROUND OF THE INVENTION

Injection heads are known for directly injecting treatment substances into eggs, such as vaccines, antibiotics or vitamins, in order to limit the mortality rate or increase the growth of the embryos. Such injection heads conventionally comprise a plurality of injectors able to move vertically above a conveyor conveying eggs to be treated, the eggs conventionally being placed in alveoli in so-called incubation trays.

There has been proposed, in particular in the patent document FR 2 873 894, an injection head in which each injector is equipped with its own movement means for moving the injector from a raised position to an injection position in which its needle can inject a substance into the egg. The injection head comprises a fixed injector support intended to be disposed above eggs to be treated, and injectors mounted on said injector support, each injector comprising an injection body, an injection needle mounted on said injection body and communicating with an inlet of said body for its supply with at least one substance to be injected, and individual movement means, such as a pneumatic actuator, by means of which the injector is connected to said injector support, said movement means being able to move said injection body between a raised position and an injection position. During the movement towards the injection position, the needle pierces the shell of the egg. After having pierced the shell, the needle pierces the shell membrane in order to inject a treatment substance into the amniotic fluid or directly into the embryo.

Between two injection cycles, the injector must be disinfected to prevent any contamination from one egg to another. One of the advantages of this type of injector, in which the needle serves both to pierce the shell and to inject the substance, is that it can easily and effectively be disinfected between two injection cycles. The pressure of the pneumatic actuator, which defines the penetration force of the needle, does, however, prove to be particularly tricky to adjust. This is because the pressure must be sufficient to pierce the shell, in particular to prevent the needle ricocheting on the shell. If the pressure is too high, the needle may break the eggshell and/or pierce the shell membrane or the embryo too violently, which may cause irreversible trauma to the embryo. In addition, the travel of the actuator is relatively long in order to be able to pierce the shell and then the shell membrane, and the rod of the actuator can have a tendency to twist.

To resolve these problems partly, it was proposed in the patent document FR 2 838 920 to inject the treatment substance under pressure from the air pocket of the egg so that the substance reaches the amniotic fluid after having passed by pressure through the shell membrane. This solution is, however, not applicable for the injection of substances, in particular vaccines, that do not withstand pressurization.

There are also known injection heads in which the injectors comprises a punch in which the needle is mounted slidably, the punch firstly being lowered to pierce the shell, and then the needle is lowered to inject the substance. The punch and needle system of this type of injector does, however, can be very difficult to clean.

SUMMARY OF THE INVENTION

An aim of the present invention is to provide a solution aimed at addressing the aforementioned drawbacks, making it possible in particular to pierce the shell and inject a substance effectively, while allowing effective and safe disinfection of the injector between two injections.

To this end, an object of the present invention is a method of injecting at least one treatment substance into an egg comprising a step of piercing the shell and at least the shell membrane by movement of a needle, and then a step of injecting the treatment substance via said needle, characterized in that said piercing step comprises a first movement of the needle to pierce the shell with a first penetration force, and then a second movement of the needle to pierce at least the shell membrane with a second penetration force lower than the first penetration force.

According to an embodiment of the present invention, the needle for piercing and injecting is firstly moved with a sufficient penetration force to pierce the shell, the distal end of the needle remaining disposed in the air pocket of the egg at the end of this first movement. Next the needle is moved with a low penetration force in order simply to pass through the shell membrane. This needle for piercing and injecting is easier to clean between two injection cycles and its movement in two times makes it possible to adapt the penetration force of the needle to each piercing to be made and thus to ensure a piercing of the shell and an injection that are effective.

According to one particular feature of the present invention, the first penetration force may be greater than or equal to 10 newtons (N), the second penetration force being less than 10 N. The first penetration force may be at least 20 N, preferably between 20 and 30 N, for example around 25 N, and/or the second penetration force may be between 7 and 2 N, for example around 4 N.

According to an embodiment of the present invention, an injection head for injecting at least one substance into eggs comprises an injector support intended to be disposed above eggs to be treated and at least one injector mounted on said injector support. The injector generally comprises an injection body, an injection needle mounted on said body and able to be supplied with at least one substance to be injected, and individual movement means able to move said injection body between a raised position and an injection position, and preferably by means of which the injector is connected to said injector support.

According to an embodiment, said injection head may comprise a fixed chassis on which said injector support is movably mounted, and main movement means able to move said injector support between a high position and a low position, said injection head being able to be controlled by a control unit in order to move the injector support from its high position to its low position by means of the main movement means, in order to pierce the shell of an egg with the needle of the injection body in the raised position, at a first penetration force, and then to move said injection body from its raised position to its injection position, in order to pierce at least the shell membrane with the needle at a second penetration force lower than the first penetration force, for injecting a substance into the egg.

According to an embodiment of the present invention, each injector comprises a tube for guiding and protecting said needle, mounted on said injection body so as to be able to move between retracted positions in which the needle is projecting with respect to the distal end of said tube and an idle position in which said tube surrounds at least the distal part of the needle, said tube being urged elastically by elastic means towards its idle position and being able to be moved towards a retracted position by putting its distal end in abutment against an egg when the injector support is in the low position.

According to another embodiment of the present invention, said individual movement means are able to move the injection body into an injection position in which the tube is in a maximum retracted position.

According to an embodiment, the main movement means comprises at least one main actuator, preferably pneumatic, one of the elements of which among its cylinder and rod is connected to the chassis, and the other element of which is connected to the injector support. The cylinder may be connected to the chassis and the end of the rod may be connected to the injector support.

According to an embodiment, the means of individual movement of the injector can also comprise at least one individual actuator, preferably pneumatic, one of the elements of which among its cylinder and rod is connected to the injector support and the other element of which is connected to the injection body. The cylinder may be connected to the injector support and the end of the rod may be connected to the injection body.

The injection head may comprise a plurality of injectors mounted on the injector support, in one or more rows.

According to an embodiment, the force of the main movement means is defined so that the first penetration force of each needle is at least 10 N, the force of the main movement means therefore being at least n×10 N for a number n of injectors mounted on the injector support, the force of the individual movement means being defined so that the second penetration force of each needle is less than 10 N.

According to an embodiment, a method of injecting at least one treatment substance into an egg comprises a step of piercing the shell and at least the shell membrane by moving a needle, and then a step of injecting the treatment substance via said needle, characterized in that said piercing step comprises a first movement of the needle to pierce the shell with a first penetration force and then a second movement of the needle to pierce at least the shell membrane with a second penetration force lower than the first penetration force. The first penetration force may be greater than or equal to approximately 10 N and the second penetration force may be lower than approximately 10 N. The first penetration force may be between approximately 20 N and approximately 30 N. The second penetration force may be between approximately 2 N and approximately 7 N.

According to an embodiment, an injection head for injecting at least one substance into eggs comprises an injector support intended to be disposed above eggs to be treated and at least one injector mounted on said injector support. The injector generally comprises an injection body, an injection needle mounted on said body and able to be supplied with at least one substance to be injected, and individual movement means able to move said injection body between a raised position and an injection position. Said injection head may comprise a fixed chassis on which said injector support is movably mounted and main movement means able to move said injector support between a high position and a low position. Said injection head may be able to be controlled in order to move the injector support from its high position to its low position by means of the main movement means, in order to pierce the shell of an egg with the needle of the injection body in the raised position, at a first penetration force, and then to move said injection body from its raised position to its injection position, in order to pierce the shell membrane of the egg with the needle at a second penetration force lower than the first penetration force, for injecting a substance into the egg.

The injector may comprise a tube for guiding and protecting said needle. The tube may be mounted on said injection body so as to be able to move between retracted positions in which the needle is projecting with respect to the distal end of said tube and an idle position in which said tube surrounds at least the distal part of the needle. Said tube may be urged elastically by elastic means towards its idle position and be able to be moved towards a retracted position by putting its distal end in abutment against an egg when the injector support is in the low position.

Said individual movement means may be able to move the injection body into an injection position in which the tube is in a maximum retracted position.

The main movement means may comprise at least one main actuator. One of the elements of the main actuator, among its cylinder and rod, may be connected to the chassis. Another element of the main actuator may be connected to the injector support.

The individual movement means of the injector may comprise at least one individual actuator. One of the elements of the at least one individual actuator, among its cylinder and its rod, may be connected to the injector support. Another element of the at least one individual actuator may be connected to the injection body.

The injector head may comprise a plurality of injectors mounted on the injector support.

BRIEF DESCRIPTION OF THE DRAWINGS

The invention may be better understood, and other aims, details, characteristics and advantages will emerge more clearly, in the detailed explanatory description that follows of an embodiment of the present invention, with reference to the accompanying schematic drawings, in which:

FIG. 1 is a schematic view in longitudinal section of an injection head according to the invention, with the injector support in the high position, and the injectors in the raised position above eggs to be treated;

FIG. 2 is a schematic view of an injector support in the low position in order to pierce the eggshells, and the injectors in the raised position in abutment against the eggs; and FIG. 3 is a schematic view of an injector support in the low position and the injectors in the injection position for injecting a substance into the eggs.

While the present invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE DRAWINGS

With reference to FIG. 1, according to an embodiment, the injection head 1 includes a plurality of injectors 2a-d mounted so as to be able to move vertically on an injector support 4, said injector support itself being mounted so as to be able to move vertically on a fixed chassis 5, intended to be disposed above a conveyor (not shown) for conveying eggs to be treated.

Each injector 2a to 2d comprises an injection body 21, roughly cylindrical in shape, comprising a solid top part and a hollow tubular bottom part, in the internal passage of which an injection needle 22 is mounted, preferably removably. The needle comprises a hollow stem, for example made from stainless steel, with a bevelled distal end 22a and a proximal end provided with a tubular connection piece for connecting it to the injection body. The top part of the body comprises an inlet 23 fluidic communication with the hollow stem of the needle, the inlet being equipped with a connection piece for its connection to a system for distributing an injectable substance. The needle extends into the internal passage of the body, and its distal end 22a is disposed beyond the bottom end of the injection body.

A tube 24 for guiding and protecting the needle, also referred to as a sleeve or socket, is slidably mounted in the internal passage and is urged towards a so-called idle position by a compression spring mounted between the proximal end of the tube and the top part of the injection body. The tube is able to retract into the tube, counter to the spring, as far as a maximum retracted position, in which the tube is, for example, in abutment against the top part of the injection body or the connecting piece of the needle. The tube receives the needle in its internal passage so as to guide and protect it.

For mounting the tube and needle, the injection body comprises a removable top part screwed for example onto the hollow bottom part. The tube comprises at its distal end an end piece 25, in the form of a centring and support cup, for example made from a flexible material such as silicone, by means of which the tube is intended to come into abutment against an egg to be treated.

In its idle position illustrated in FIG. 1 according to an embodiment, the tube is, for example, in abutment against a shoulder of the internal passage, the distal end of the needle is disposed in the tube or in the end piece, retracted with respect to the circular edge of the end piece. The injection body is advantageously equipped with means of cleaning the needle, as described in the aforementioned patent documents. The bottom part of the tube and/or the cup may, for example, be equipped with a channel (not shown) for injecting a disinfectant onto the needle between two injection cycles.

Each injector also comprises an individual movement system, here formed by an individual pneumatic actuator 26. The injection body is mounted by its top part at the end of the rod 26a of the individual actuator, and the injector is mounted by means of the cylinder 26b of the individual actuator on the injector support 4. The individual actuators individually move each injection body between a raised position illustrated in FIGS. 1 and 2 and a low injection position illustrated in FIG. 3, the position varying according to the size of the egg to be treated, as described below.

The injectors are mounted vertically by means of the cylinder of their actuator on the injector support in one or more rows. By way of example, the head comprises four parallel rows of injectors, each of the injectors 2a-2d as shown in the figures belonging to a different row. The injector support 4 is in the form of a rigid plate, the cylinders 26b of the individual actuators extending above the injector support, and the actuator rods carrying the injection bodies extending below the injector support. Each individual actuator is associated with a system for guidance in vertical translation and anti-rotation, comprising a guidance rod 41 mounted on the injector support, extending downwards parallel to the actuator rod and passing through a hole in a horizontal plate 42 interdependent with the actuator rod.

The injector support is mounted substantially horizontally on the chassis 5 by means of at least one main pneumatic actuator 6. This main actuator is assembled by its cylinder 61 on the chassis 5 and the injector support 4 is assembled at the free end of the rod 62 of the main actuator. The main actuator is able to move the injector support between a high position, illustrated in FIG. 1, and a low position, illustrated in FIGS. 2 and 3, in which the injector support is in abutment against a damping system 51 mounted on the chassis. The chassis is intended to be disposed, fixedly, above a conveyor conveying incubation trays in the alveoli of which the eggs to be treated are disposed. The rows of injectors are disposed substantially perpendicular to the direction of travel of the trays.

A description of a cycle of injection by means of the injection head according to the invention will now be given with reference to the figures.

An incubation tray is brought under the injection head, the alveoli substantially aligned vertically with the injectors. The eggs are placed in the alveoli in the tray, the large side of the eggs upwards. In the example illustrated, the injector 2a is in line with an alveolus containing a small-sized egg 9a, the injectors 9b and 9c are in line with alveoli containing eggs of normal size, while the injector 2d is in line with an empty alveolus. The injector support is in the high position and the injection bodies in the raised position. The injectors are disposed vertically above and at a distance from the eggs.

According to an embodiment, first the main actuator 6 is actuated by a head control unit in order to lower the injector support into its low position, as illustrated in FIG. 2. During this movement, the cups 25 of the injectors 2a-c come into contact with the facing eggs 9a-9c and their tube 24 partially retracts into the bottom part of the injection body 21 counter to the spring. This retraction movement thus enables the needles 24 to project from the tubes and to pierce the shells 91 in order to penetrate the eggs. The force of the main actuator is defined so that the penetration force of the needles is sufficient to pierce the shells without breaking them. As indicated previously, the penetration force of the each needle is at least 10 N. For a number n of injectors mounted on the injector support, the force of the main actuator is therefore at least equal to n×10 N. The travel of the main actuator is defined so that, in the low position of the injector support, all the eggshells can be pierced, even those of small-sized eggs 9a, and so that the shell membranes of the eggs, shown schematically under the reference 92, are not pierced by the needles, the free ends of the needles having to be disposed in the air pocket of the eggs. As can be seen in FIG. 2, the tubes 24 of the injectors 2a-2c are more or less retracted according to the size of the eggs, without reaching their maximum retracted position. In the absence of a facing egg, the needle of the injector 2d is protected in the tube, which remains in the idle position.

The individual actuators 26 of the injectors are then actuated in order to individually move the injection bodies towards their injection position, as illustrated in FIG. 3. The force of each individual actuator is just sufficient to make it possible to pierce the shell membrane. It is slightly greater than the elastic return force of the spring of the tube 24, and is defined so that the movement of the actuator body stops as soon as the tube 24 arrives in the maximum retracted position. The injection position of each injection body is therefore reached when its tube is in the maximum retracted position. Thus the injection position of an injection body varies from one injector to another according to the size of the egg.

As can be seen in FIG. 3, the rods 26a of the individual actuators 26 of the injectors 2b and 2c are only slightly deployed in comparison with that of the individual actuator of the injector 2a. In the absence of any egg, the tube 24 of the injector 2d remains in its idle position and the rod of its actuator is deployed to the maximum. In these injection positions of the injection bodies, the needles have passed through the shell membrane 91 of the eggs. The injection of a substance via the needles can then be effected, for example in the amniotic fluid of the eggs.

The inlets of the injectors are connected to a system for distributing substance to be injected. The distribution system, to which the inlets 23 of the injectors are connected, can then be controlled by the head control unit in order to deliver a given quantity of substance to be injected. By way of example, the force of the main actuator provides a penetration force of approximately 25 N at each needle, and its travel is approximately 50 mm. In the case of an injector support carrying 40 injectors in four rows of 10 injectors, the force of the main actuator is approximately 1000 N. The force of each individual actuator provides a penetration force of approximately 4 N and its maximum travel is approximately 30 mm.

The length of the needles and the length and travel of the tubes can be defined so that, when the individual actuators are actuated, the needles pierce the shell membrane and the allantoic membrane of the eggs for injecting a substance into the allantoic fluid, or pierce the shell membrane, the allantoic membrane and the amniotic membrane for injection into the amniotic fluid. Provision can also be made for the needles to prick the embryo in order to inject the substance directly into it.

Once the injection has been carried out, the injection bodies are returned to their retracted position through control of the individual actuators, and the injector support is returned to its high position through control of the main actuator. These actuator commands can be effected successively or substantially simultaneously. During these movements, the tubes return to the idle position under the effect of the springs in order to protect the needles.

Although the invention has been described in relation to a particular embodiment, it is obvious that it is in no way limited thereto and that it comprises all technical equivalents of the means described as well as combinations thereof if these come within the scope of the invention.

The invention claimed is:

1. An injection head for injecting at least one injectable substance into an egg having a shell and a shell membrane, the injection head comprising:
   an injector support positionable above the egg;
   at least one injector coupled to the injector support, the at least one injector comprising:
      an injection body;
      an injection needle mounted on the injection body and configured to receive the at least one injectable substance; and
      an individual actuator for each said at least one injector for shifting the injection body of said at least one injector between a raised position and an injection position;
   a fixed chassis, the injector support movably coupled to the chassis; and
   a main actuator for shifting the injector support between a high position and a low position;
   wherein the main actuator is controlled to shift the injector support from its high position to its low position so the injection needle in the raised position pierces the shell of the egg with a first penetration force and the individual actuator is controlled to shift the injection body from its raised position to its injection position so the injection needle pierces the shell membrane of the egg with a second penetration force, the second penetration force being lower than the first penetration force.

2. The injection head of claim 1, wherein the at least one injector further comprises a tube coupled to the injection body and shiftable between a first retracted position wherein a distal portion of the needle is projecting with respect to a distal end of the tube and an idle position wherein the tube surrounds at least the distal portion of the needle, the distal end of the tube positionable in abutment with the egg when the injector support is in the low position; and
   elastic means for elastically urging the tube toward the idle position.

3. The injection head of claim 2, wherein the individual actuator is configured to shift the injection body into the injection position, the tube being maximally retracted when the injection body is in the injection position.

4. The injection head of claim 1, wherein the main actuator comprises a cylinder and a rod.

5. The injection head of claim 1, wherein the individual actuator comprises a cylinder and a rod.

6. The injection head of claim 4, wherein the cylinder is coupled to the chassis and the rod is coupled to the injector support.

7. The injection head of claim 4, wherein the rod is coupled to the chassis and the cylinder is coupled to the injector support.

8. The injection head of claim 5, wherein the cylinder is coupled to the injector support and the rod is coupled to the injection body.

9. The injection head of claim 5, wherein the rod is coupled to the injector support and the cylinder is coupled to the injection body.

* * * * *